United States Patent Office.

WILLIAM P. FENNELL, OF LOUISVILLE, KENTUCKY, ASSIGNOR TO MARGARET FENNELL, OF SAME PLACE.

Letters Patent No. 114,784, dated May 16, 1871.

IMPROVEMENT IN COMPOUNDS FOR CURE OF CHILLS AND FEVER.

The Schedule referred to in these Letters Patent and making part of the same.

I, WILLIAM P. FENNELL, of the city of Louisville, county of Jefferson and State of Kentucky, have invented a certain new and useful Compound for the Cure of Chills and Fever.

The nature of my invention or discovery consists in mixing together quinine, saltpeter, and brimstone, dissolved in cognac brandy in the following proportions, viz.:

Quinine, one-half dram; saltpeter, three drams; brimstone, one-half ounce; cognac brandy, one gill; the whole to be mixed together, and when fully dissolved is ready for use.

I claim as my invention—

The manufacture or preparation of a compound which is denominated cure for chills and fevers, of the ingredients, in the proportions, and for the purpose set forth.

WILLIAM P. FENNELL.

Witnesses:
C. HEWITT,
E. F. HUYCK.